(12) United States Patent
Jayakar et al.

(10) Patent No.: US 11,059,449 B2
(45) Date of Patent: Jul. 13, 2021

(54) ROOF-MOUNTED OCCUPANT RESTRAINT SYSTEM

(71) Applicant: TRW Vehicle Safety Systems Inc., Washington, MI (US)

(72) Inventors: Hylus Ranjit Raj Jayakar, Shelby Township, MI (US); Kurt F. Fischer, Rochester, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 44 days.

(21) Appl. No.: 16/414,865

(22) Filed: May 17, 2019

(65) Prior Publication Data

US 2020/0361410 A1  Nov. 19, 2020

(51) Int. Cl.
| | | |
|---|---|---|
| *B60R 21/16* | (2006.01) | |
| *B60R 21/2338* | (2011.01) | |
| *B60R 21/214* | (2011.01) | |
| *B60R 21/01* | (2006.01) | |
| *G05D 1/02* | (2020.01) | |

(52) U.S. Cl.
CPC .......... *B60R 21/2338* (2013.01); *B60R 21/01* (2013.01); *B60R 21/214* (2013.01); *B60R 2021/23386* (2013.01); *G05D 1/021* (2013.01)

(58) Field of Classification Search
CPC . B60R 21/232; B60R 21/214; B60R 21/2338; B60R 2021/23161; B60N 2/143
USPC .......................................... 280/743.1, 743.2
See application file for complete search history.

(56) References Cited

U.S. PATENT DOCUMENTS

| | | | |
|---|---|---|---|
| 9,533,650 B2 | 1/2017 | Le Norcy et al. | |
| 9,676,361 B2 | 6/2017 | Smith et al. | |
| 9,707,921 B2 | 7/2017 | Fischer et al. | |
| 10,471,923 B2* | 11/2019 | Jimenez | B60R 21/0136 |
| 10,688,954 B2* | 6/2020 | Thomas | B60R 21/215 |
| 10,688,955 B2* | 6/2020 | Shin | B60R 21/01512 |
| 2015/0203066 A1* | 7/2015 | Pausch | B60R 21/214 |
| | | | 280/730.1 |
| 2018/0043852 A1* | 2/2018 | Fischer | B60R 21/233 |
| 2018/0065585 A1* | 3/2018 | Jaradi | B60N 2/14 |
| 2018/0215338 A1* | 8/2018 | Faruque | B60R 21/214 |
| 2018/0229681 A1* | 8/2018 | Jaradi | B60R 21/237 |
| 2018/0272985 A1 | 9/2018 | Nagasawa | |
| 2019/0161048 A1 | 5/2019 | Thomas et al. | |
| 2019/0161049 A1 | 5/2019 | Thomas et al. | |
| 2019/0217804 A1* | 7/2019 | Cho | B60R 21/214 |
| 2019/0375363 A1* | 12/2019 | Abe | B60R 21/214 |

\* cited by examiner

*Primary Examiner* — Toan C To
(74) *Attorney, Agent, or Firm* — Tarolli, Sundheim, Covell & Tummino LLP

(57) ABSTRACT

A restraint system (10) for helping to protect an occupant (60) of a vehicle (20) having a roof (32) and a cabin (40) with a seat (50) for the occupant (60) includes an airbag (70) mounted to the vehicle roof (32). The airbag (70) has a stored condition and is inflatable to a deployed condition. The airbag (70), when deployed, extends from an upper end (90) connected to the vehicle roof (32) to a lower end (92) positioned adjacent the occupant (60). The airbag (70) has a U-shaped configuration including a first leg (104) and a second leg (106) pivotable relative to the first leg (104) in response to occupant (60) penetration into the second leg (106). A tether (120) has first and second ends (122, 124) each connected to the airbag (70) for limiting pivotal movement of the second leg (106) relative to the first leg (104).

13 Claims, 6 Drawing Sheets

ROOF-MOUNTED OCCUPANT RESTRAINT SYSTEM

TECHNICAL FIELD

The present invention relates generally to vehicle airbags and, in particular, relates to a roof-mounted airbag having a tether.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

According to one aspect, a restraint system for helping to protect an occupant of a vehicle having a roof and a cabin with a seat for the occupant includes an airbag mounted to the vehicle roof. The airbag has a stored condition and is inflatable to a deployed condition. The airbag, when deployed, extends from an upper end connected to the vehicle roof to a lower end configured to engage the occupant. The airbag has a U-shaped configuration including a first leg and a second leg pivotable relative to the first leg in response to occupant penetration into the second leg. A tether has first and second ends each connected to the airbag for limiting pivotal movement of the second leg relative to the first leg.

According to another aspect, a restraint system for helping to protect an occupant of a vehicle having a roof and a cabin with a seat for the occupant includes an airbag mounted to the vehicle roof. The airbag has a stored condition and is inflatable to a deployed condition. The airbag, when deployed, extends from an upper end to a lower end configured to engage a lap of the occupant such that the lap acts as a reaction surface for limiting movement of the airbag in response to occupant penetration. The airbag has a U-shaped configuration including a first leg and a second leg pivotable relative to the first leg in response to occupant penetration into the second leg. The second leg has a first condition spaced from the first leg prior to occupant penetration and a second condition engaging the first leg in response to occupant penetration. A tether is connected to the second leg and the upper portion for limiting pivotal movement of the second leg relative to the first leg.

Other objects and advantages and a fuller understanding of the invention will be had from the following detailed description and the accompanying drawings.

DETAILED DESCRIPTION

Figure 1:
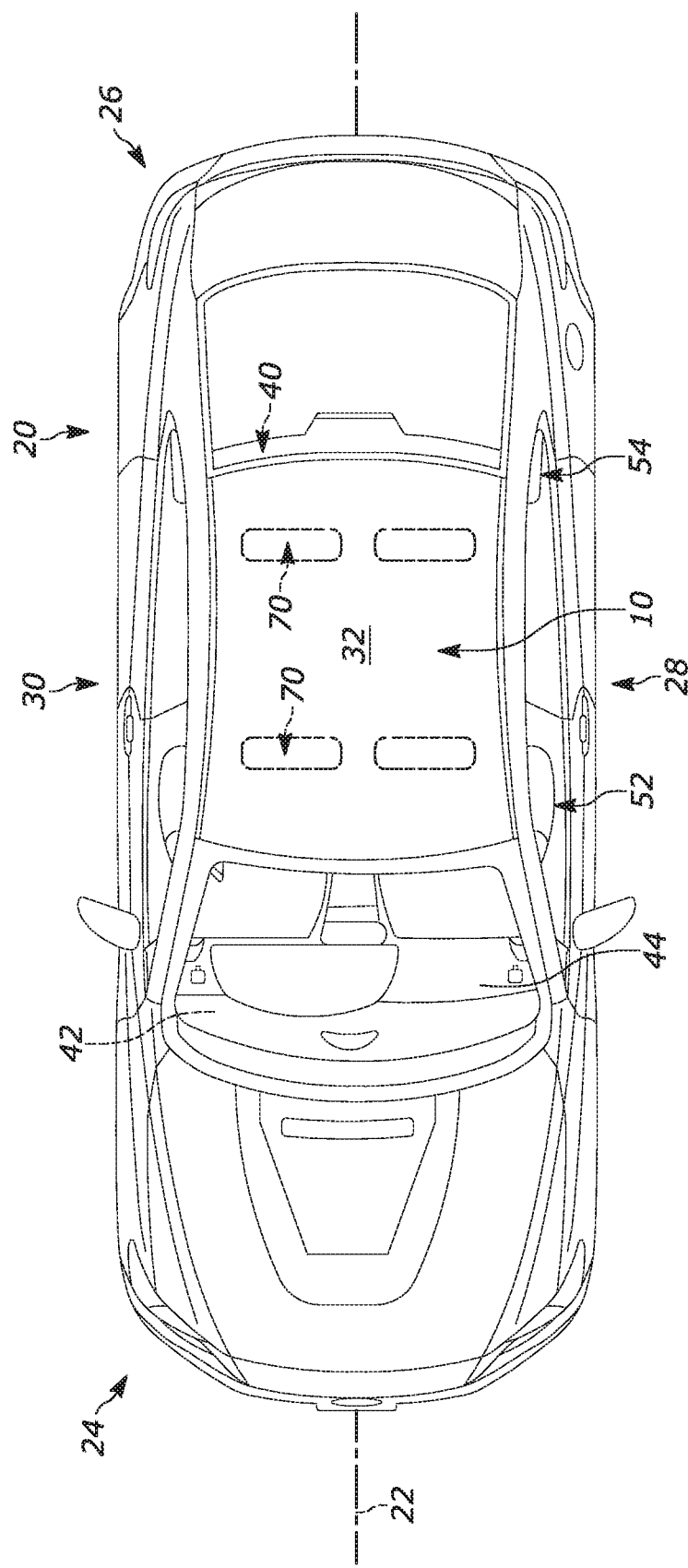
FIG. 1 is a top view of a vehicle including an example roof-mounted, occupant restraint system.
Figure 2:
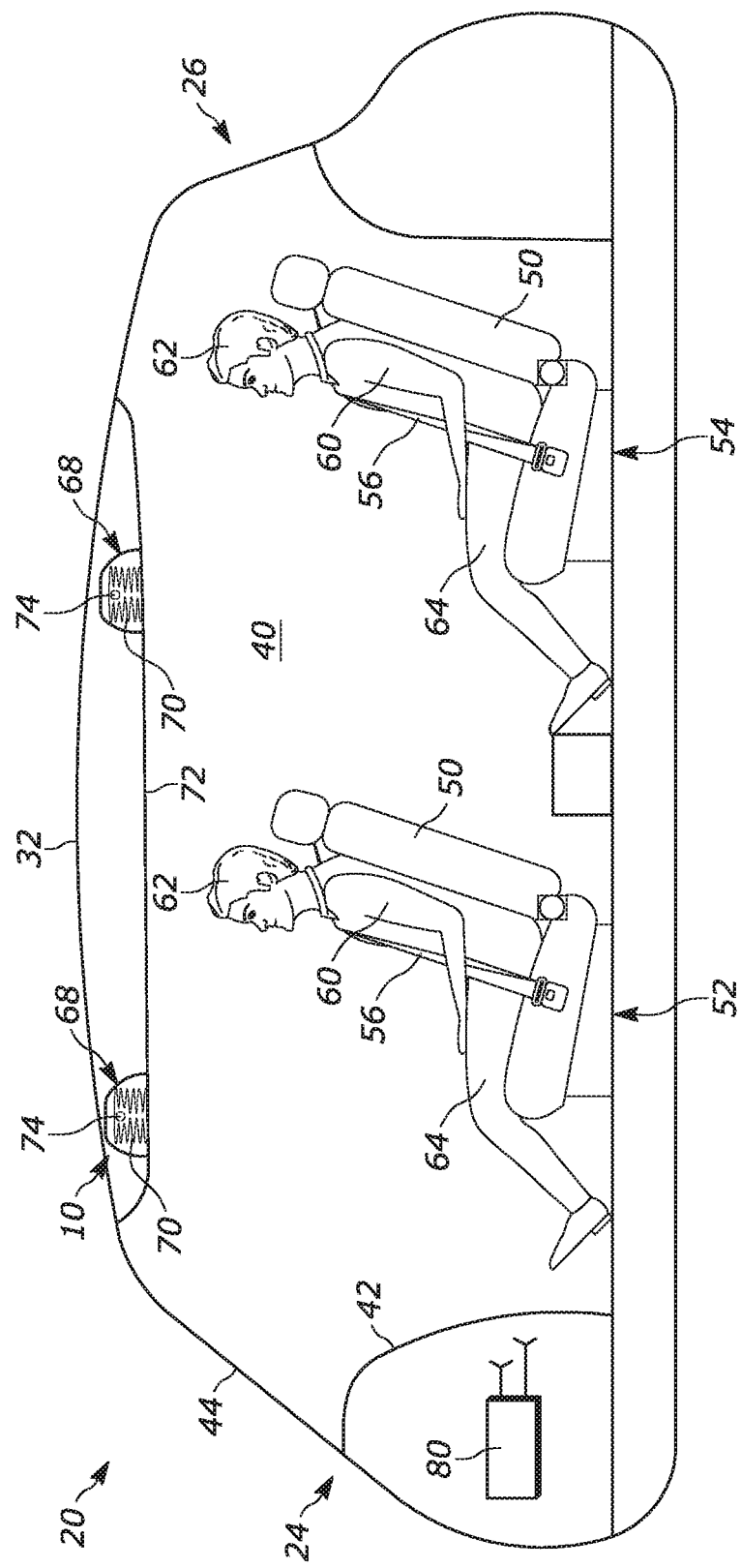
FIG. 2 is a schematic illustration of a cabin of the vehicle with a first seating arrangement and an example airbag of the restraint system in a stored condition.

The present invention relates generally to vehicle airbags and, in particular, relates to roof-mounted airbags that include a tether. FIGS. 1-2 illustrate an example vehicle safety system in the form of an occupant restraint system 10. The vehicle 20 extends along a centerline 22 from a first or fore end 24 to a second or aft end 26. The vehicle 20 extends to a left side 28 and a right side 30 on opposite sides of the centerline 22. The first end 24 of the vehicle 20 includes an instrument panel 42 facing a passenger compartment or cabin 40. A windshield or windscreen 44 can be located between the instrument panel 42 and the roof 32.

The vehicle 20 can be an autonomous vehicle, in which case the cabin 40 can be without operator controls, such as a steering wheel, pedals, instrumentation, center console, etc. Accordingly, the instrument panel 42 can be reduced in size or removed altogether in order to maximize the space in the cabin 40.

Seats 50 are positioned in the cabin 40. In this open passenger cabin 40 configuration, the vehicle seats 50 can be configured, positioned, and arranged in a variety of manners, not constrained by the need to facilitate a vehicle driver/operator. For example, in FIG. 2, the seats 50 can be arranged in front and rear rows 52 and 54, respectively, arranged in a forward-facing manner similar to that of conventional automobiles. It will be appreciated that the vehicle 20 could alternatively include more or fewer rows of seats 50 (not shown). Regardless, each seat 50 is fitted with a seatbelt 56 for restraining its occupant 60.

For the conventional, forward-facing seating arrangement of FIG. 2, in the event of a frontal crash, the occupants 60 of both the front and rear rows 52, 54 are restrained by their respective seatbelts 56. Additional restraints are, however, desirable for head and neck support. This additional protection is typically provided, at least for the front row 52 occupants, by instrument panel mounted airbags. In the autonomous vehicle 20 of FIG. 2, however, the instrument panel can be reduced in size and/or removed altogether. Control interfaces for climate controls, GPS, navigation, entertainment, etc. can, for example, be provided in a center console area of the vehicle 20 located between the occupants 60 of the front and/or rear rows 52, 54.

Figure 3:
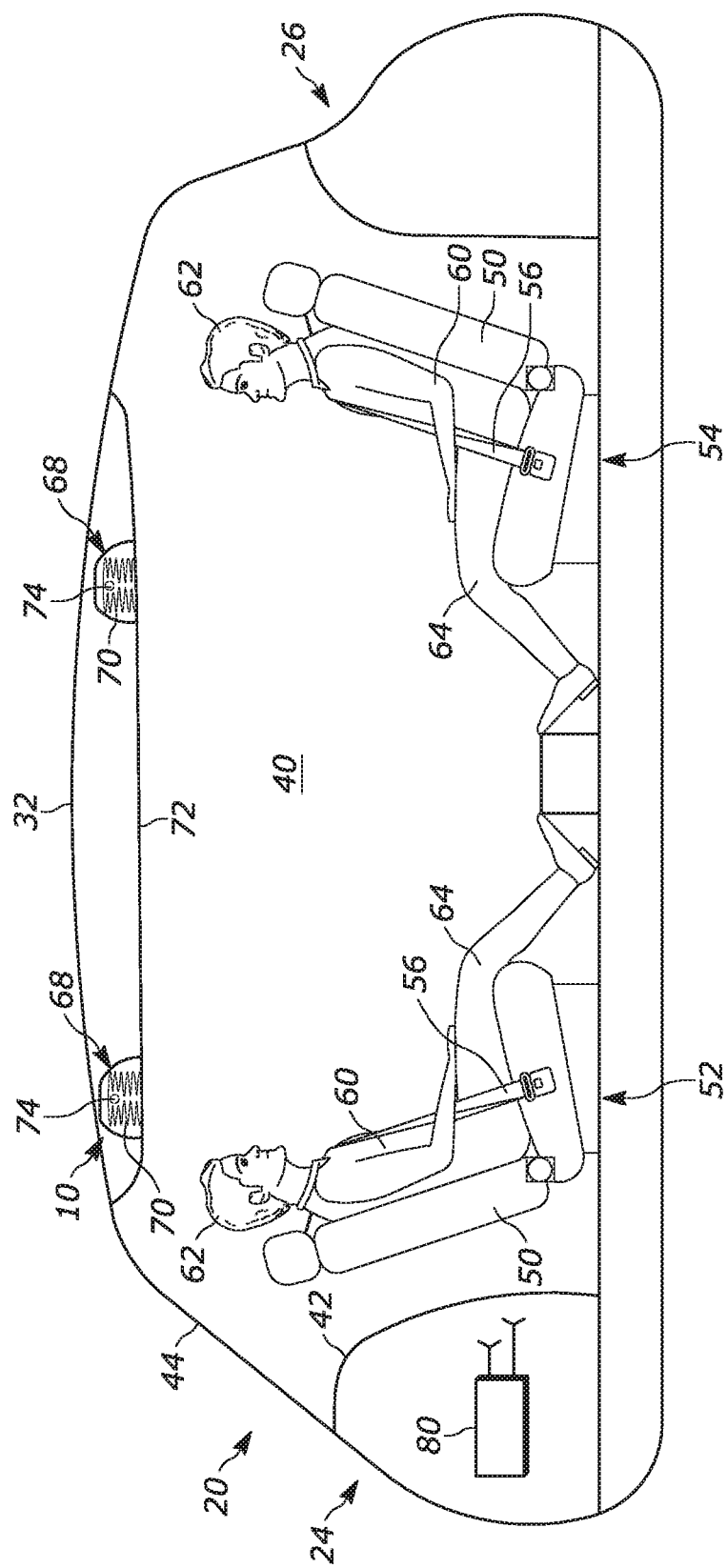
FIG. 3 is a schematic illustration of a cabin of the vehicle with a second seating arrangement and another example airbag of the restraint system in a stored condition.

In another seating arrangement shown in FIG. 3, the vehicle 20 includes two rows of seats 50 that face each other, with the front row 52 being rearward-facing and the rear row 54 being forward-facing. More or fewer rows of seats facing in either direction are also contemplated.

For the unconventional, forward-rearward seating arrangement shown, in the event of a frontal crash, the occupants 60 of the forward-facing rear row 54 are restrained by their respective seatbelts 56. Occupants 60 of the rear-facing front row 52, while buckled, are supported in a frontal crash by the seatbacks of the vehicle seats 50. Because of this, the seats 50 must be constructed to support the occupants 60 in the event of a crash. For the forward-facing occupants 60 in the rear row 54, the seatbelts 56 offer some degree of restraint. It is desirable, however, for both rows 52, 54 to include additional restraints for head and neck support.

In either seating arrangement, since the front row 52 need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume and could also present problems in deploying the airbag(s) into that large volume in the necessary short time required to protect the occupants in a crash scenario.

It is therefore evident that the various passenger seating configurations enabled by autonomous vehicles can present challenges to the conventional concepts of airbag protection. Furthermore, since airbags require structure supporting the deployed airbag against movement in response to occupant penetration (e.g., a reaction surface), the absence of typical vehicle architecture that acts as a reaction surface, such as an instrument panel, presents additional challenges.

To account for these challenges, the occupant restraint system 10 shown in FIGS. 1-2 includes at least one vehicle occupant protection device in the form of an inflatable airbag 70 mounted in the roof 32 of the vehicle 20. Mounting the airbags 70 in the vehicle roof 32 is convenient because the airbags can be positioned in a location with a desired proximity to the occupant(s) 60 they are intended to help protect. This can help reduce the necessary inflatable volume of the airbags 70 and can also help provide a desired airbag deployment time without requiring an excessively high-volume inflator.

The airbags 70 are housed/concealed in the roof structure of the vehicle 20 behind, for example, a roof liner 72. The airbag 70 is at least one of rolled and folded before being placed behind the roof liner 72. The rolled airbag 70 can be provided in a cover or housing/module 68 that is then placed behind the roof liner 72. The occupant restraint system 10 also includes an inflator 74 positioned in each module 68 for providing inflation fluid to each airbag 70. The inflators 74 are operatively connected (e.g., by wires) to an airbag controller 80 (see FIG. 2) that includes or communicates with one or more crash sensors (not shown). The airbag controller 80 is operative to determine the occurrence of a crash event and to actuate the inflators 74 in a known manner to inflate the airbags 70. The inflators 74 can be of any known type, such as stored gas, solid propellant, augmented or hybrid.

The airbag 70 can be constructed of any suitable material, such as nylon (e.g., woven nylon 6-6 yarns), and may be constructed in any suitable manner. For example, the airbag 70 may include one or more pieces or panels of material. If more than one piece or panel is used, the pieces or panels can be interconnected by known means, such as stitching, ultrasonic welding, heat bonding, or adhesives, to form the airbag 70. The airbag 70 can be uncoated, coated with a material, such as a gas impermeable urethane, or laminated with a material, such as a gas impermeable film. The airbag 70 can therefore have a gas-tight or substantially gas-tight construction. Those skilled in the art will appreciate that alternative materials, such as polyester yarn, and alternatives coatings, such as silicone, may also be used to construct the airbag 70.

The occupant restraint system 10 can include multiple airbags 70 provided along the roof 32 and within the roof liner 72 at locations associated and aligned with each seat 50 in each row 52, 54. In other words, each seat 50 in the vehicle 20 can have an individual module 68 (with corresponding airbag 70 and inflator 74) associated and aligned therewith. In each case, the airbag 70 is positioned in front of the associated seat 50 in each row 52, 54 in the direction the occupants 60 in those seats would face. In the seating arrangement of FIG. 2, the airbags 70 are located forward of the front row 52 and forward of the rear row 54. In the seating arrangement of FIG. 3, the airbags 70 are located rearward of the front row 52 and forward of the rear row 54.

The airbags 70 extend in the left-to-right direction of the vehicle 20 and generally parallel to the width of the seats 50. In the example shown in FIG. 3, airbags 70 are provided behind the roof liner 72 and are each associated with a single seat 50 in each row 52, 54. Alternatively, a single airbag 70 can span the entire width of the cabin 40 to protect all the occupants 60 in an entire row 52 or 54 (not shown).

Since the front row 52 need not face forward and need not be in close proximity to the instrument panel 42 or the area where an instrument panel would normally reside, there can be a large volume of space between the front row 52 and the forward cabin structure presented facing the front row. Because of this, it may not be efficient to deploy airbags from this location due to the large volume that the airbags would need to occupy. This would present problems in sizing the airbag(s) and inflator(s) to occupy that large volume, and could also present problems in deploying the airbag(s) into that large volume in the necessary short time required to protect the occupants in a crash scenario.

With this in mind, although the airbags within each example construction described herein are identical for each row provided in the vehicle 20, the construction and operation of only the airbag associated with a seat 50 in the rear row 54 is discussed for brevity.

Figure 4:
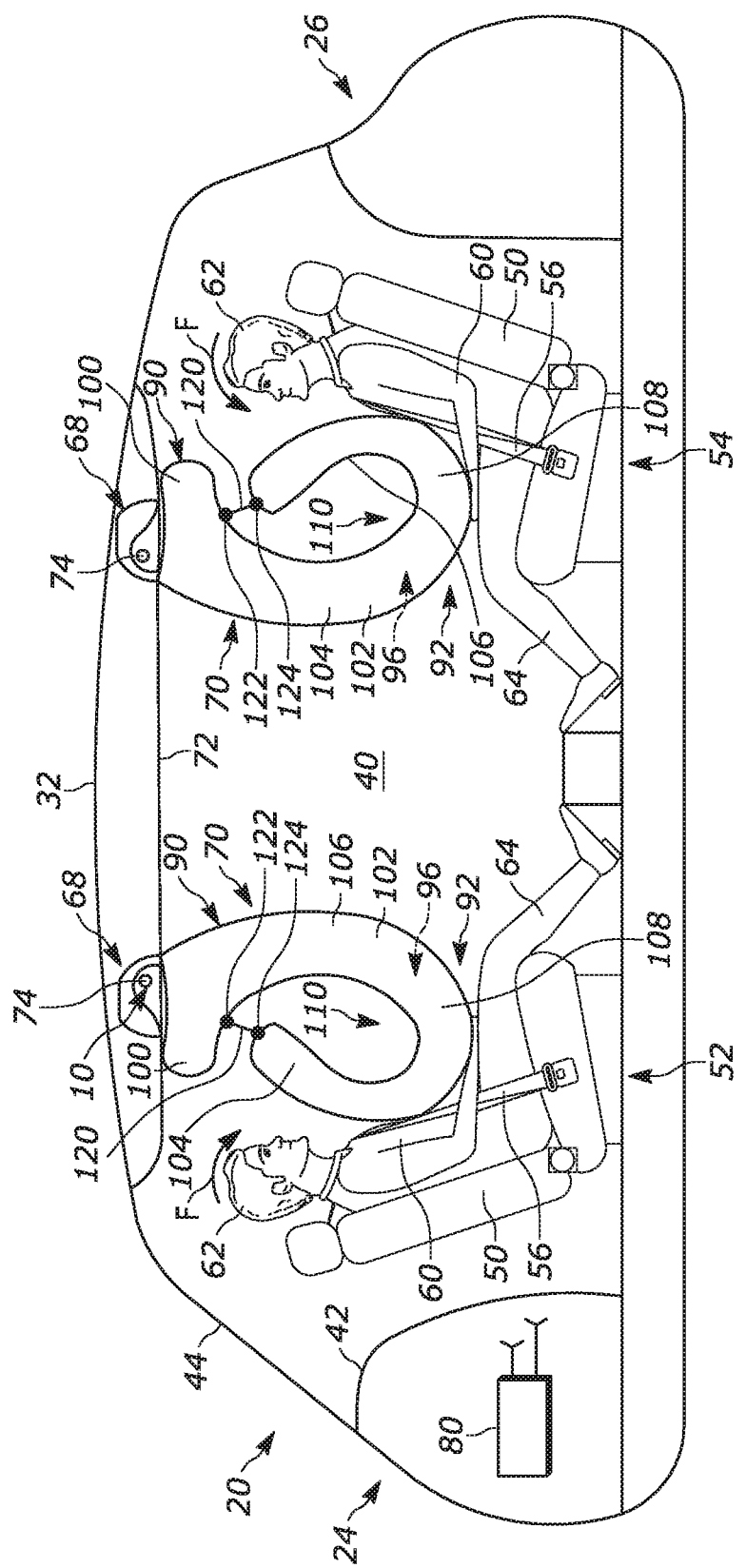
FIG. 4 is a schematic illustration of the cabin of the vehicle with the airbag in a deployed condition.

As shown in FIG. 4, upon sensing the occurrence of an event for which inflation of the airbag 70 is desired, such as a vehicle collision, the controller 80 provides signals to the inflator 74. Upon receiving the signals from the controller 80, the inflator 74 is actuated and provides inflation fluid to the inflatable volume of the airbag 70 in a known manner. The inflating airbag 70 exerts a force on the roof liner 72, which causes the roof liner to open (e.g., via tear seam or door). This releases the airbag 70 to inflate and deploy from a stored condition behind the roof liner 72 to a deployed condition extending into the cabin 40 forward of and aligned with the seat 50 in the rear row 54. The airbag 70, while inflated, helps protect the vehicle occupant 60 in the rear row 54 by absorbing the impact of the occupant.

The airbag 70, when deployed, extends from an upper end 90 to a lower end 92 and defines an inflatable volume 96. The upper end 90 is connected to the vehicle 20 and fluidly connected to the inflator 74. The lower end 92 is positioned adjacent an occupant 60 in the rear row 54. In one example, the lower end 92 is configured to engage a lap or lower torso 64 of the occupant 60.

The airbag 70 includes a first portion 100 extending along the roof 32/roof liner 72 and a second portion 102 connected to the first portion and having a U-shaped configuration. The second portion 102 includes a pair of spaced-apart legs 104, 106 interconnected by a connecting portion 108. The leg 104 is connected to the first portion 100. The leg 106 forms a free end of the second portion 102. The legs 104, 106 terminate adjacent the roof 32/roof liner 72. The connecting portion 108 is positioned closer to the occupant 60. The legs 104, 106 are especially resistant to movement toward each other because of the pressurized inflation fluid therein. This preloads the legs 104, 106 against movement toward each other.

The U-shaped airbag 70 has a smaller inflatable volume 96 than a single chamber construction having the same outer, peripheral footprint while using more airbag fabric to define the inflatable volume. Since the legs 104, 106 of the U-shaped airbag 70 have comparatively small thicknesses, they have a high surface area-to-volume ratio. This renders the legs 104, 106 relatively and comparatively stiff when inflated.

When the airbag 70 inflates and deploys, the pressurized inflation fluid therein tends to urge the leg 106 to pivot away from the leg 104 towards the rear end 26 of the vehicle 20. Consequently, a tether 120 is connected to different portions of the airbag 70 for limiting relative movement between the legs 104, 106 during inflation and deployment. The tether 120 has a first end 122 connected to the upper end 90/first portion 100 and a second end 124 connected to the leg 106. The tether 120 is formed from an inextensible material and is external to the airbag 70 (i.e., the tether extends outside the inflatable volume 96). The first end 122 and/or the second end 124 can constitute or include a stress reducer for spreading the connection between the tether 120 and the airbag 70 over a large surface of the airbag fabric so as to prevent tearing.

Figure 5:
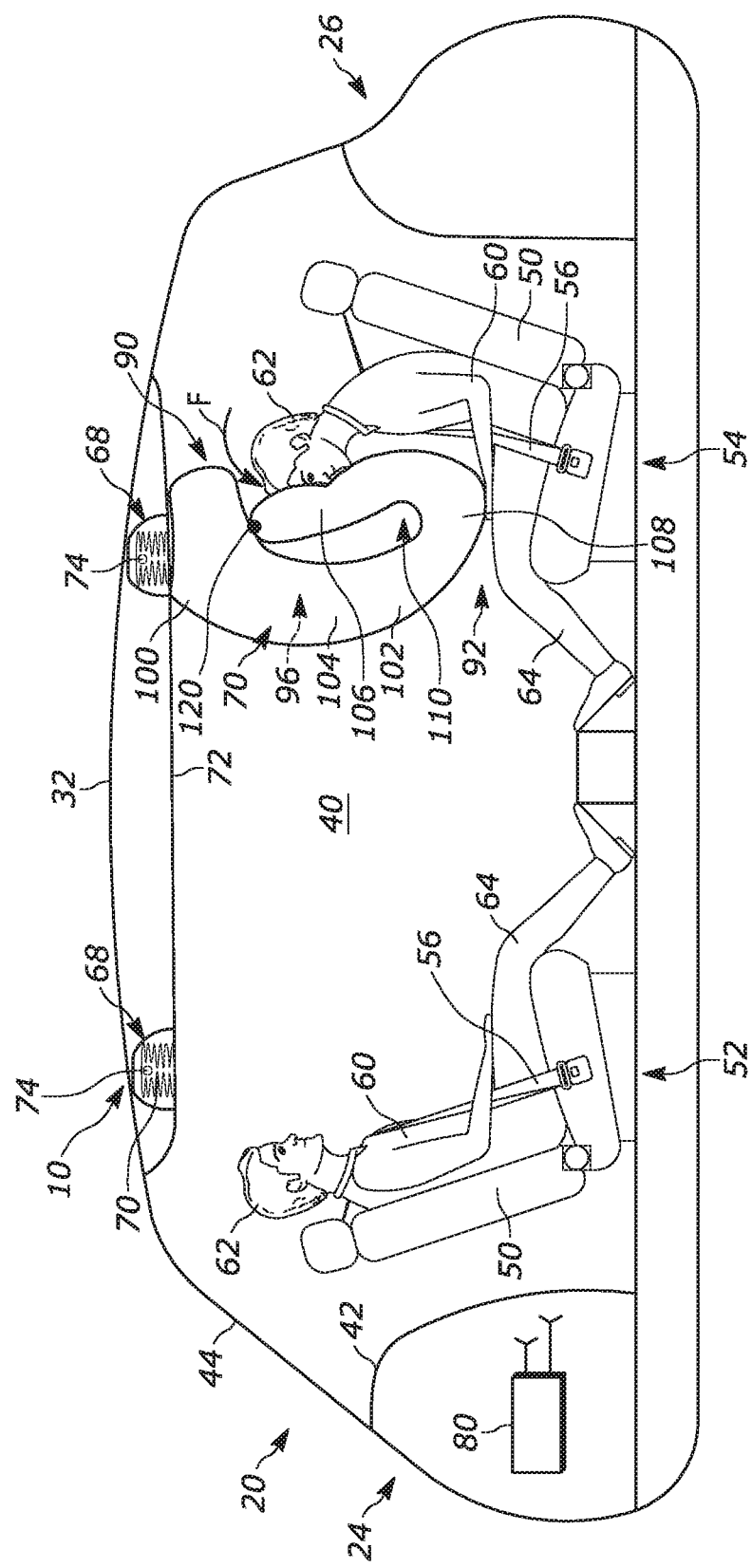
FIG. 5 is a schematic illustration of occupant penetration into the airbag.

Because the occupant 60 is belted, a frontal crash resulting in forward occupant movement causes the occupant to bend at the waist and follow an angled or arcuate path toward the leg 106 of the airbag 70, as indicated generally by the arrow F in FIGS. 4-5. Once the moving occupant 60 engages the inflated leg 106, the airbag 70 is urged to move in the direction F As noted, there is no vehicle structure in position to act as a reaction surface to constrain movement of the deployed airbag 70. That said, engagement of the lower end 92 of the airbag 70 with the occupant 60 restricts/prevents movement of the lower end of the airbag during occupant penetration. The lower end 92 can engage, for example, the lap or lower torso 64 of the occupant 60 (as shown), the occupant's legs and/or the upper torso (not shown). That said, both ends (the top and bottom as shown) of the leg 104 can be held in place while only one end (the bottom as shown) of the leg 106 is held.

With the upper and lower ends 90, 92 of the airbag 70 held by the vehicle roof 32 and occupant lap 64, respectively, penetration of the occupant 60 into the leg 106 causes the leg 106 to move in the path F towards the leg 104 (see FIG. 5). More specifically, the leg 106 pivots about the connecting portion 108 towards the leg 104 and relative to the upper and lower ends 90, 92.

The inflation fluid in the leg 106 that biases the leg 106 away from the leg 104, coupled with the connecting portion 108 engaging the occupant's lap 64, provides a first level of resistance to movement of the occupant 60 in the direction F. The leg 106 moves in the direction F until it engages the leg 104. Since the upper and lower ends 90, 92 at opposite ends of the leg 104 are held in place by the vehicle roof 32 and occupant lap 64, the leg 104 is more securely held in place than the leg 106 and therefore the leg 104 provides a second, greater level of resistance to movement of the occupant 60 in the direction F. As a result, once the legs 104, 106 engage one another the legs thereafter cooperate to restrain and ultimately prevent further movement of the occupant 60 in the direction F.

The tether 120, being connected to the leg 106 and the upper end 90, limits the degree to which the leg 106 pivots away from the leg 104. Consequently, the tether 120 dictates how much movement in the direction F the occupant 60 can/will experience before the legs 104, 106 engage one another and further occupant movement is prevented.

In this manner, the resistance provided by the legs 104, 106, coupled with the upper and lower ends 90, 92 being held in place by the vehicle roof 32 and occupant lap 64, provides a reaction forces that is opposite the impact forces applied to the airbag 70 by the penetrating occupant 60. More specifically, constraining movement of the upper and lower ends 90, 92 enables the legs 104, 106 to restrict movement of the occupant 60 along the path F. The example airbag 70 therefore requires no interaction with forward structure of the vehicle, such as an instrument panel, steering wheel, or seat, to provide a reaction surface for the airbag.

Figure 6:
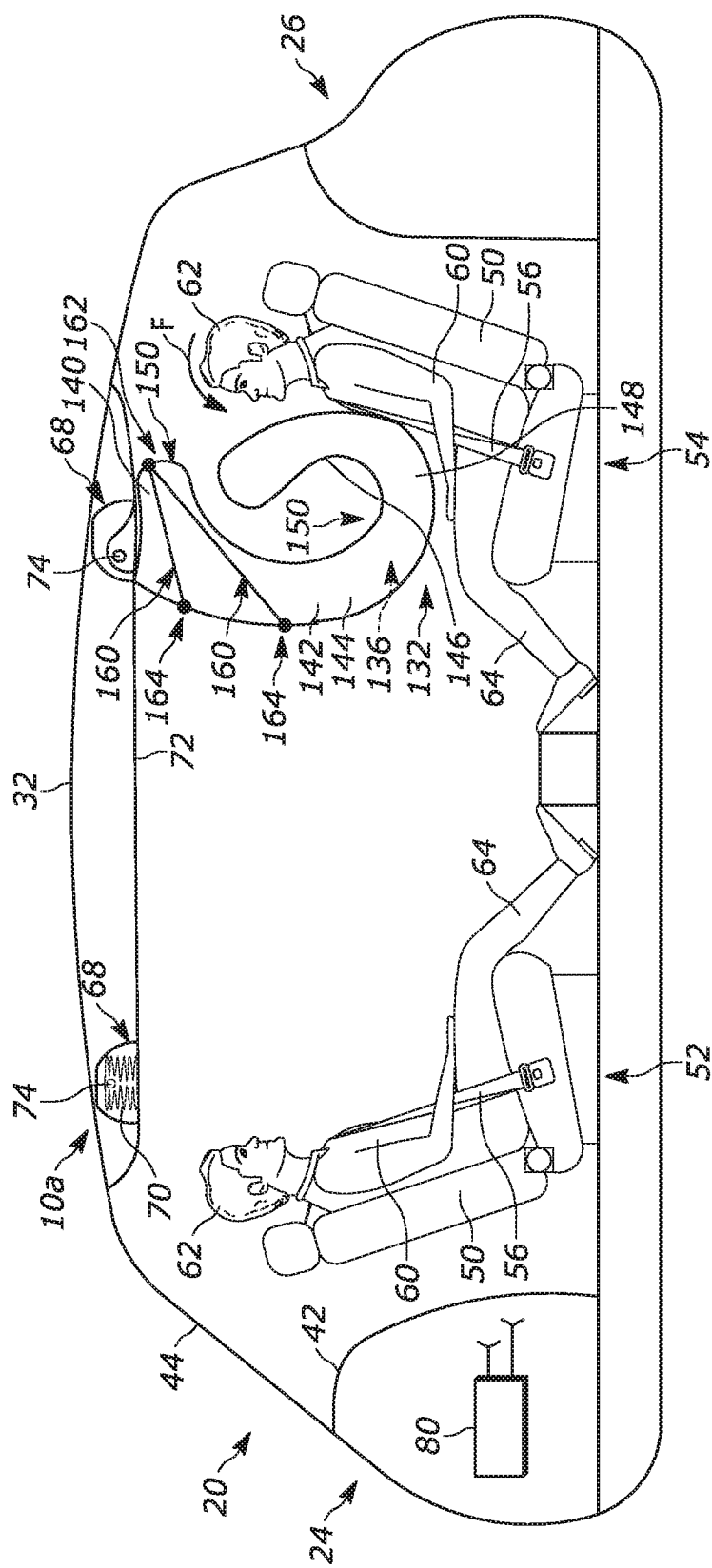
FIG. 6 is a schematic illustration of another example airbag in a deployed condition.

FIG. 6 illustrates another example configuration of the occupant restraint system 10a. In FIG. 6, the airbag module 68 includes an airbag 70a and tethers 160 self-contained within the air bag module. The tethers 160 are self-contained in that they are integral to the airbag module 68 and can therefore be installed in the vehicle 20 simply through installation of the modules in the roof 32.

The airbag 70a, when deployed, extends from an upper end 130 to a lower end 132 and defines an inflatable volume 136. The upper end 130 is connected to the vehicle 20 and fluidly connected to the inflator 74. The lower end 132 is positioned adjacent an occupant 60 in the rear row 54 but is specifically designed to be spaced entirely from the lap and lower torso 64 of the occupant 60.

The airbag 70a includes a first portion 140 extending along the roof 32/roof liner 72 and a second portion 142 connected to the first portion and having a U-shaped configuration. The second portion 142 includes a pair of spaced-apart legs 144, 146 interconnected by a connecting portion 148. The leg 144 is connected to the first portion 140. The leg 146 forms a free end of the second portion 142. The legs 144, 146 terminate adjacent the roof 32/roof liner 72. The connecting portion 148 is positioned closer to the occupant 60 but spaced therefrom.

The self-contained tethers 160 support the airbag 70a against movement in response to occupant 60 penetration. Each self-contained tether 160 extends from a first end 162 connected to structure of the airbag module 68, such as the housing, or to the first portion 140. As shown, both first ends 162 are connected at the same spot to the first portion 140 but they could be spaced apart from one another (not shown). The second ends 164 of the tethers 160 are connected to the leg 144 of the airbag 70a. Alternatively, a single tether (not shown) can have both ends connected to the leg 144 and a middle portion connected to the module 68 or first portion 140. Regardless, it will be appreciated that the tether(s) 160 can be provided internal to the airbag 70a (within the inflatable volume 136) or external to the airbag (connected to the outside thereof).

The tethers 160 limit the distance the lower end 132 of the airbag 70a can move away from the vehicle roof 32 when the lower end does not engage the occupant. To this end, the tension that the self-contained tethers 160 apply to the airbag 70a can at least partially or substantially oppose the impact forces applied to the airbag by the penetrating occupant 60 and thereby provide the desired ride-down characteristics. In this manner, airbag module 68 and/or first portion 140 acts as the reaction surface for the airbag 70a.

Additionally, the tether(s) 160 can limit movement of the leg 144 away from the occupant 60 in response to engagement of the occupant with the leg 146 and subsequently movement of the leg 146 through the space 150 into engagement with the leg 144. The tension applied by the tether(s) is opposite the forces applied by the moving leg 146 towards and into engagement with the leg 144. The tether(s) 160 can thereby help limit/prevent movement of the leg 144 and allow the airbag 70a [which does not engage the occupant's lap 64] to provide desired ride-down characteristics similar to the manner in which the airbag 70 [which engages the occupant's lap] provides ride-down characteristics.

From the above, it will be appreciated that the example configurations of FIGS. 1-6 illustrate that the airbag is configured to utilize the vehicle roof, the airbag, and/or occupant as reaction surfaces in both the conventional and unconventional seating arrangements. By "reaction surface," it is meant that it is the vehicle roof, airbag, and/or occupant that support the airbag against movement in response to an impacting occupant. In other words, the airbag attempts to move in a first direction and the roof/occupant/airbag/module apply a reaction force to the airbag in a second, opposite (or substantially opposite) direction to limit/prevent movement of the airbag in the first direction. This allows the airbag to absorb impact forces of the occupant and provide the desired ride-down effect.

Advantageously, the example configurations can require only the vehicle roof, airbag module, and/or the occupant to provide the reaction surfaces and can provide effective occupant protection without requiring any support from structure presented forward of the occupants. The vehicle roof can also support the airbag module and the airbag entirely.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

We claim:

1. A restraint system for helping to protect an occupant of a vehicle having a roof and a cabin with a seat for the occupant, comprising:
   an airbag mounted to the vehicle roof, the airbag having a stored condition and being inflatable to a deployed condition, wherein the airbag, when deployed, extends from an upper end connected to the vehicle roof to a lower end configured to engage a lap of the occupant such that the lap acts as a reaction surface for limiting movement of the airbag in response to occupant penetration, the airbag having a U-shaped configuration including a first leg and a second leg pivotable relative to the first leg in response to occupant penetration into the second leg; and
   a tether extending within an inflatable volume of the airbag and having first and second ends each connected to the airbag for limiting pivotal movement of the second leg relative to the first leg.

2. The restraint system recited in claim 1, wherein the first end of the tether is connected to the first leg and the second end of the tether is connected to the upper end.

3. The restraint system recited in claim 1, wherein the lower end of the airbag is configured to engage the occupant.

4. The restraint system recited in claim 1, wherein the second leg has a first condition spaced from the first leg prior to occupant penetration and a second condition engaging the first leg in response to occupant penetration.

5. The restraint system recited in claim 4, wherein the second leg provides a first degree of resistance to occupant penetration prior to engaging the first leg and the first and second legs cooperate to provide a second, greater degree of resistance to occupant penetration when engaged with one another.

6. The restraint system recited in claim 1, wherein the first and second legs are interconnected by a connecting portion at the lower end of the airbag to form the U-shaped configuration.

7. The restraint system recited in claim 1, further comprising:

a sensor for sensing the occurrence of an event for which deployment of the airbag is desired and producing a signal indicative thereof; and a controller connected to the sensor and, in response to receiving the signal, actuating an inflator to inflate the airbag to the deployed condition.

8. The restraint system recited in claim 1, wherein the first and second ends of the tether are positioned below the vehicle roof.

9. The restraint system recited in claim 1, wherein the first end of the tether is secured to the upper end of the airbag below the vehicle roof.

10. The restraint system recited in claim 1, wherein the first and second ends of the tether are directly secured to the first leg and a middle portion of the tether between the first and second ends is directly secured to the upper end.

11. The restraint system recited in claim 1, further comprising a second tether extending within the inflatable volume and having first and second ends each connected to the airbag, the first ends of the tether and the second tether being secured to the same spot of the airbag.

12. The restraint system recited in claim 11, wherein the same spot is on the upper end of the airbag.

13. The restraint system recited in claim 11, wherein the first ends are secured to the upper end and the second ends are secured to the first leg.

\* \* \* \* \*